United States Patent [19]

Lake

[11] Patent Number: 4,756,571

[45] Date of Patent: Jul. 12, 1988

[54] LOAD BED LIFT-ROOF COVER

[75] Inventor: William H. R. Lake, Lathrup Village, Mich.

[73] Assignee: Trail-R-Van Inc., Lathrup Village, Mich.

[21] Appl. No.: 52,906

[22] Filed: May 22, 1987

[51] Int. Cl.$^4$ ............................ B60P 7/02; B60P 3/32
[52] U.S. Cl. .................................. 296/100; 296/165; 296/172; 296/176
[58] Field of Search ................ 296/100, 163–165, 296/167, 172, 173, 176

[56] References Cited

U.S. PATENT DOCUMENTS

| | | | |
|---|---|---|---|
| 3,512,828 | 5/1970 | Craft | 296/100 |
| 3,785,698 | 1/1974 | Dean et al. | 296/100 |
| 3,923,334 | 12/1975 | Key | 296/10 |
| 3,954,296 | 5/1976 | Patnode | 296/10 |
| 4,079,989 | 3/1978 | Robertson | 296/100 |
| 4,101,162 | 7/1978 | Koehn | 296/100 |
| 4,221,423 | 9/1980 | Stone | 296/100 |
| 4,252,363 | 2/1981 | Rodrigue | 296/100 |
| 4,324,429 | 4/1982 | Wilson et al. | 296/100 |
| 4,335,916 | 6/1982 | Gutgsell | 296/100 |
| 4,533,171 | 8/1985 | Lake | 296/173 |
| 4,613,181 | 9/1986 | Rafi-Zadeh | 296/100 |
| 4,639,034 | 1/1987 | Amos | 296/100 |

OTHER PUBLICATIONS

Article, magazine unknown, Mar. 1984, p. 115, "Telescopic Top".

Primary Examiner—Dennis H. Pedder

[57] ABSTRACT

A lift-roof cover for a light truck open load bed, comprising a lift-roof structure pivotally attached about a lateral axis to the lower edge of the cover forward wall, the forward wall being fixedly mounted to the load bed with flexible weatherproof panelling interposed between the lift-roof structure and the forward wall so that, alternately, secure weatherproof enclosure of the load bed may be provided with the lift-roof structure in a lowered position, or the lift-roof structure may be raised at the rear about the lateral axis, providing improved access to the load bed. A preferred embodiment incorporates the use of compression struts to provide lift assist in raising the lift-roof structure and accomodates the application of flexible curtains to provide full enclosure with the lift-roof in a raised position, while maintaining high degrees of commonality with methods of manufacture, handling, shipping and storage employed for high volume production load bed covers of the prior art.

5 Claims, 6 Drawing Sheets

LOAD BED LIFT-ROOF COVER

BACKGROUND OF THE INVENTION

The invention relates to covers for application to open load beds of light trucks and, more particularly, to an improved cover design having a lift-roof providing improved access to the load bed and extending vehicle functions to additional uses.

Reference is made here to U.S. Pat. No. 4,533,171 (Lake) for an improved Lift-Roof Trailer. The invention seeks to satisfy a demand for benefits similar to those provided by the referent lift-roof trailer, but as applied to light open bed trucks, and has been pursued in response to need expressed by owners of such vehicles who participated in market surveys for the improved lift-roof trailer at the Detroit Camper and Travel Trailer Show of 1983 and the MUCC Outdoorama Show of 1984 in Detroit.

Various forms of fixed cover have been manufactured for use with open load bed light trucks. These prior art forms include covers fabricated primarily from fiberglass reinforced plastic or from aluminum. In the majority of designs, these covers present a front view profile which is approximately matched with the front view profile of the passenger compartment or cab, so that maximal volume enclosure is provided relative to the vehicle frontal area and, hence, maximal load volume efficiency relative to fuel economy. The majority of these covers of the prior art are also fixedly attached to the load bed on which they are mounted, except at the rear wall area above the vehicle load bed tailgate. The rear wall usually incorporates an approximately vertical access door, or window, attached at its upper edge to the main structure of the cover by lateral hinging means and equipped with latching and locking means to provide security when closed. Such designs of fixed mount, cab height cover are hereinafter referred to as conventional fixed mount covers.

Primary objectives of load bed cover designs for light trucks include to provide secure, fully enclosed protection for a maximal load volume, within capacity constraints for the vehicle and its load bed. Secondary objectives include the provision of convenient access to the cargo area and optimization of vehicle fuel economy and dynamic handling effects due to aerodynamic and weight characteristics of the cover within the constraints of other objectives. However, to some degree, when a fixed mount design is used, a conflict exists between the need for optimal fuel economy with acceptable vehicle handling and the desire for convenient access. This is because any increase in cover height above the passenger cab roof will increase the frontal area, thereby reducing fuel economy due to an associated increase in vehicle aerodynamic drag, as well as possibly adversely affecting vehicle handling due to a raised center of gravity. Therefore, most covers incorporate a roof surface which is aerodynamically blended with that of the passenger cab. With existing conventional fixed mount designs of the prior art, although volume enclosure is near maximal relative to any vehicle fuel economy effects, access is limited to rear entry and this is via an opening which is limited, with respect to fuel economy, by the height of the vehicle passenger cab. This access may be improved with use a sloping rear door or window and by raising the roof height toward the rear of the cover. However, such designs may compromise fuel economy and/or load volume capacity for a small improvement in access from the rear, with little or no improvement in access from the sides.

Various other types of cover have been marketed which have been designed to provide improved levels of convenience in access to the load bed, while also providing secure load enclosure when required. These include rigid covers having a frontal profile of lower than cab height, which are pivoted about a lateral axis in proximity to the upper edge of the load bed forward wall. With such forward-hinged rigid covers, a low profile has been found necessary to maintain an acceptable appearance with a shape which avoids interference of the cover with the passenger cab, when in an open position. A load bed cover of this concept has been marketed by J. K. Enterprises of Pacific Grove, Calif. Another low profile cover concept providing improved access from above the load bed employs two roof sections with opening accomodated by the sliding action of one section above or below the other, as in a cover marketed by Robbins Products of Arlington, Tex.

A major disadvantage of low profile covers is that a significant portion of the enclosed load volume is given up relative to that provided by a conventional cover of full cab height. This disadvantage is avoided, in a two section sliding cover marketed by Specialty Equipment Sales of West Bend, Ind. by adding walls to extend the cover to full cab height. However, the complexity and cost of manufacture become less competitive.

Other lift-roof cover designs have employed a lateral pivot axis at a cover forward roof surface in a location somewhat rearward of the forward wall, so that a rearward portion may be pivoted upward for improved access. Such designs have generally been pursued in fiberglass reinforced plastic, but have resulted manufacturing costs which are relatively high with volume capacity and access which are less than may be desirable.

A lower cost method, which has been employed to provide access from the side with full volume enclosure, has used a conventional cover form with a longitudinal pivot axis on one side of the vehicle. However, while access from one side is improved with an open cover, access from the rear and from the other side is still relatively restricted. A load bed cover marketed by Keil Manufacturing, Inc. of Napoleon, Mich. overcomes this deficiency by employing a flexible, weatherproof fabric stretched over rigid, but movable, rigid support hoops of cab height. In this concept, the rigid support hoops may be slid forward on rails which are fixedly mounted to the upper edges of the two load bed side walls, and so provide the desired improved access to the load bed. However, this concept has obvious limitations in the levels of security provided and introduces new complexities in methods of manufacture and installation relative to conventional fixed mount covers of full cab height.

Since the majority of light truck load bed covers are of conventional, full cab height, fixed mount design, the methods for manufacturing and distribution of load bed covers have been developed, in the majority, to suit these conventional designs. Any design of load bed cover which cannot be manufactured, handled or stored using the methods and equipment established for conventional covers is, therefore, likely to involve additional costs in bringing it to the user.

SUMMARY OF THE INVENTION

Accordingly, a general object of my invention is to provide an improved cover of full cab height which (1) provides advantages of improved access to the vehicle load bed, (2) maintains the efficiency benefits of maximal enclosed load volume feasible within the approximate limits of the front view profile of the passenger cab and (3) requires minimal deviation from established low cost methods of construction, shipping and handling employed for conventional cab height, fixed mount covers of the prior art.

The improved cover differs from a fixed mount design toward its forward end in that the major load enclosing structure of the cover, hereinafter referred to as the lift-roof structure, is pivotally attached about a lateral axis in proximity to the lower edge of the cover forward wall and, as installed, to the upper edge of the load bed forward wall. As installed for use, only the cover forward wall and associated parts are fixedly attached to the vehicle load bed. A panel of flexible, weatherproof fabric is interposed between the cover forward wall and the outer surface of the lift-roof structure in such a way that, in a closed position, said flexible fabric is stretched taut and a weatherproof enclosure is created above the lift-roof pivot axis, having an outer form which is similar to that of a conventional fixed mount cover. However, the rearward end of the lift-roof structure may be raised and, under this condition, the flexible weatherproof fabric collapses between the cover forward wall and the lift-roof structure as the lift-roof structure pivots upward about the lateral pivot axis.

In order to provide secure closure equivalent to that of a conventional fixed mount cover when the lift-roof structure is in a lowered position, inside latching means are provided between the lift-roof structure and the vehicle load bed, with mountings toward the rearward end of the lift-roof structure. Compression strut means are pivotally attached between the lift-roof structure and compression strut means forward attachments fixedly mounted with respect to the vehicle load bed, so that the convenience of an assisted lift is provided when the lift-roof structure is raised to an open position.

The preferred embodiment of the compression strut means forward pivotal attachments is a frame which may be mounted to the forward wall and connected via the compression strut means to the lift-roof structure in a manner alternate to that employed for installed service, so that for shipping or storage of the cover assembly, the forward wall may be held in a desired orientation relative to the lift-roof structure with no component part of the cover assembly projecting significantly below a plane drawn across the lower edges of the lift-roof structure. By this means, a rigid outer form of the cover may be maintained which is similar to that of conventional covers of the prior art, thus facilitating handling with use of the same methods and means employed for such conventional covers.

The invention lends itself to various adaptations and refinements providing added convenience or specialised uses. Amongst these would be the addition of rigid struts to fixedly support the lift-roof structure in a fully or partly open position, as may be desirable for extended periods of use in an open condition. Another is the addition of fabric panelling or curtains to provide full enclosure of the load bed with the cover in a raised position, as may be useful for such purposes as camping.

In summary, my invention provides a combination of the following advantages relative to fixed mount covers and/or opening roof covers of the prior art:

Provision of access to the load bed from both sides when open;

Provision of improved access to the load bed from the rear;

Capability for traveling with the roof in a raised position, accomodating transportation of cargo which is greater in height than may transported using a conventional fixed mount cover of the prior art;

Provision of approximately the same load volume enclosure when closed as provided by fixed mount conventional covers of the prior art;

Provision of the same convenience of access with similar protection, vehicle fuel economy and handling when in a closed condition to that afforded by conventional fixed mount covers of the prior art;

Minimization of changes in manufacturing methods which are necessary from those established for low cost conventional fixed mount covers of the prior art;

Avoidance of need for changes in methods of handling, shipping and storage from those employed for conventional fixed mount covers of the prior art;

Vehicle installation procedures which approximate the simplicity of those required for conventional fixed mount covers of the prior art;

Accomodation of removable flexible fabric panelling or curtains to provide enclosure with the roof in a raised position, for such purposes as low cost camping.

Improved accomodation for the use of slide-in camping equipment.

Further objects and advantages will become readily apparent to those skilled in the art to which the invention pertains upon reference to the following detailed description of a preferred embodiment.

DESCRIPTION OF THE DRAWINGS

The description refers to the accompanying drawings in which reference characters refer to like parts throughout the several views and in which.

DETAILED DESCRIPTION OF THE PREFERRED EMBODIMENTS

Figure 1:
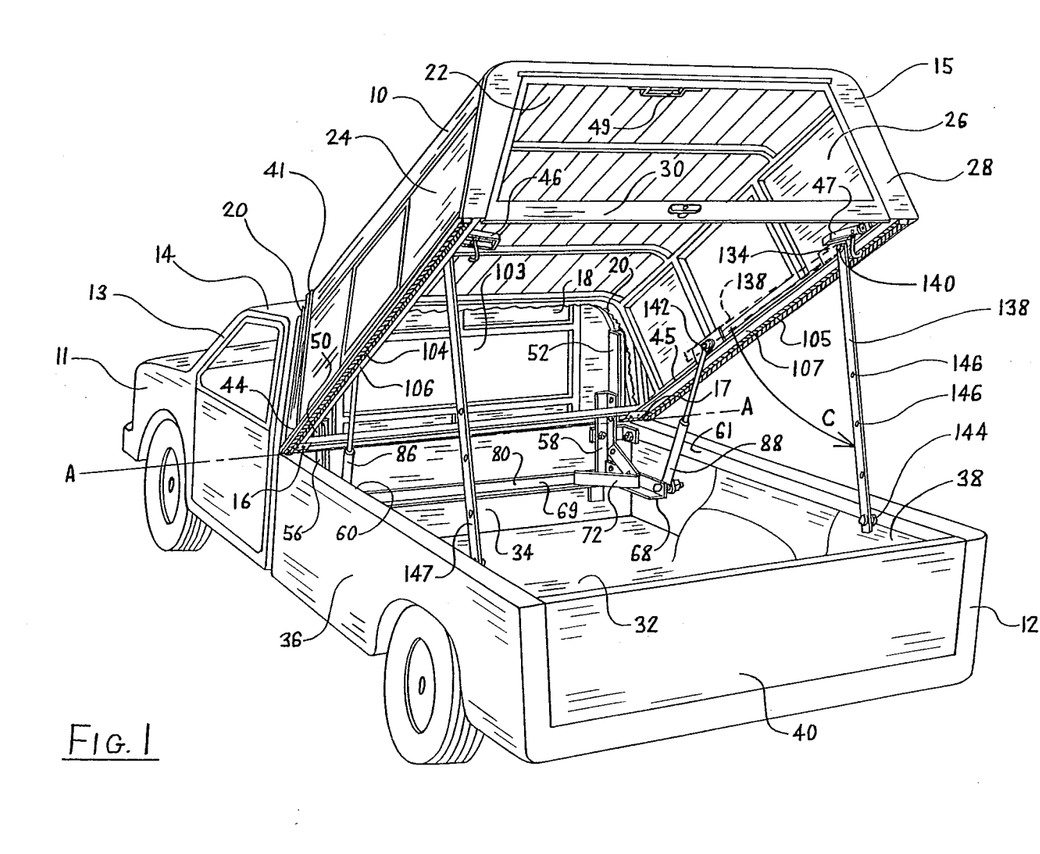
FIG. 1 is a perspective view from the rear of a lift-roof cover installed on a light truck load bed and in a raised condition.
Figure 2:
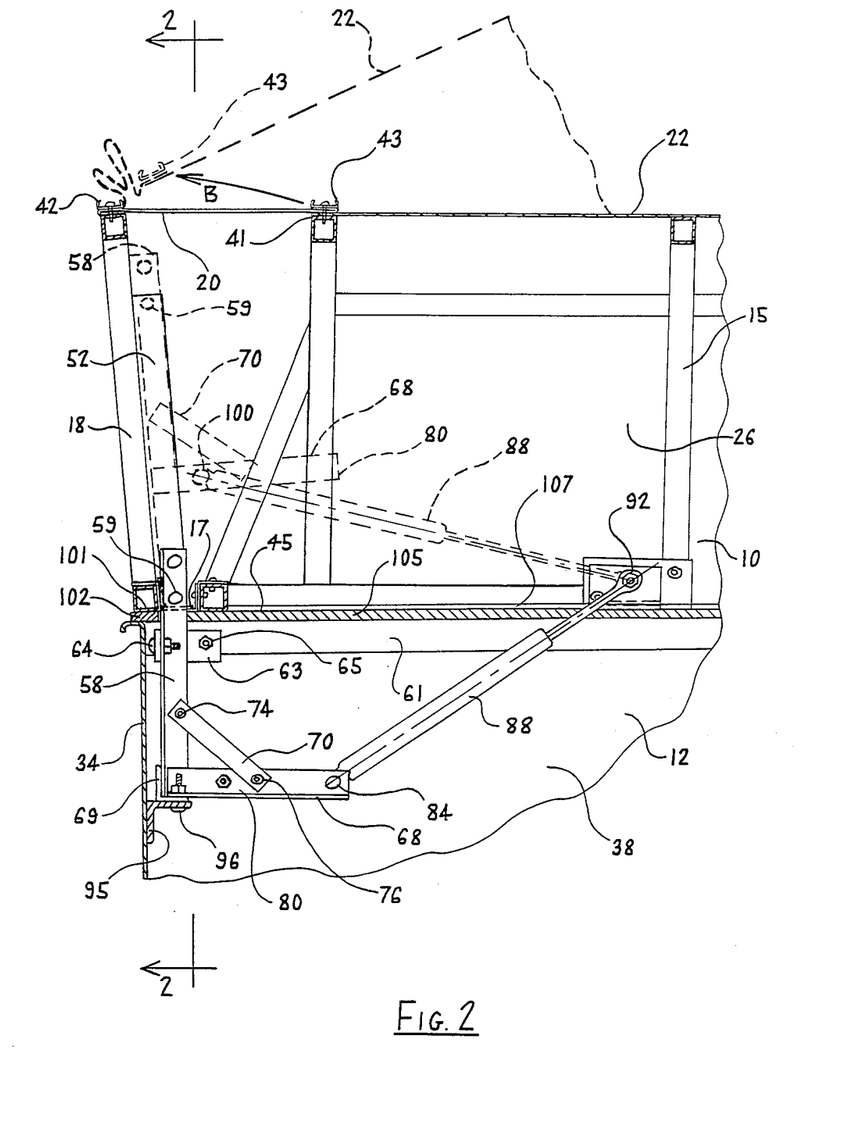
FIG. 2 is a view along lines 1—1 of FIG. 4, showing a right cover wall and mounting arrangement of a right compression strut means.
Figure 3:
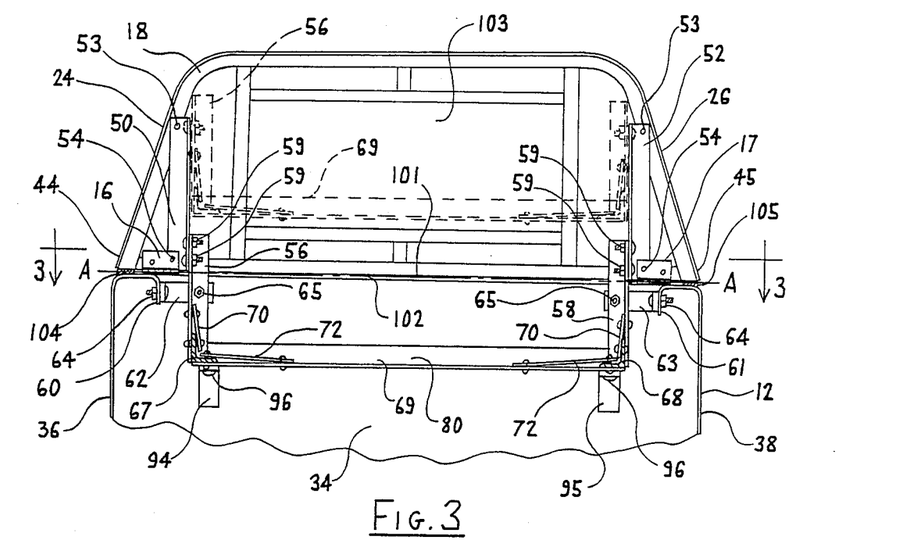
FIG. 3 is a view along lines 2—2 of FIG. 2, showing a lift-roof cover forward wall as mounted to a light truck load bed.
Figure 4:
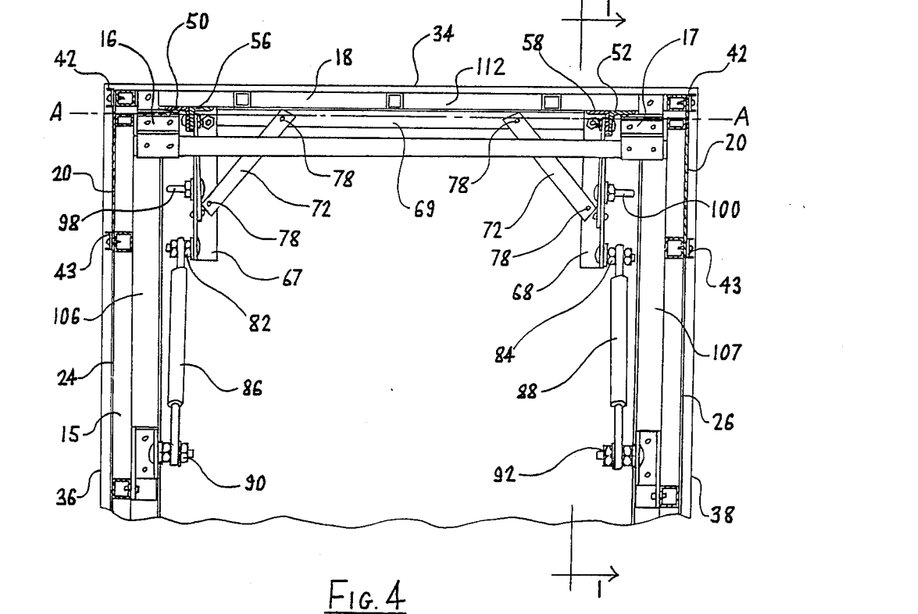
FIG. 4 is a fragmentary sectional plan view along lines 3—3 of FIG. 3, showing an arrangement of compression strut means pivotal attachments to a lift-roof structure and forward wall.

Referring to FIG. 1 and FIG. 2: the lift-roof cover 10 is mounted on a truck or vehicle 11 having a load bed 12 and passenger compartment or cab 13 incorporating a cab roof 14; the lift-roof cover 10 comprising a lift-roof structure 15 pivotally attached by left and right hinges 16, 17 respectively to a cover forward wall 18, with flexible weatherproof fabric 20 interposed between said lift-roof structure 15 and said forward wall 18 above said hinges 16, 17; said lift-roof structure 15 comprising a cover roof 22, a cover left wall 24, a cover right wall 26 and a cover rear wall 28, said cover rear wall 28 including a hinged door or window 30; the load bed 12 having a floor 32, a load bed forward wall 34, a load bed left wall 36, a load bed right wall 38 and a load bed tailgate 40.

In use, the cover forward wall 18 is fixedly attached to said vehicle load bed 12. With the lift-roof cover 10 in a closed lower condition, as shown in solid line in FIG. 2, a first line drawn through the hinge axis A—A and a forward edge 41 of the lift-roof structure 15, as seen in side view, forms an angle with a second line drawn through the hinge axis A—A and the cover forward wall 18, said angle having an intersection at the hinge axis A—A. The flexible weatherproof fabric 20 is interposed between the cover forward wall 18 and the lift-roof structure 15 so that, with the lift-roof structure 15 in a lowered position, said fabric 20 is in a slightly stretched or taut condition and, with the lift-roof structure 15 pivoted in direction of arrow B of FIG. 2 to a raised, open position, as shown in broken outline, said fabric 20 is folded or collapsed in the angle between the cover forward wall 18 and the lift-roof structure forward edge 41. Said fabric 20 is attached to the forward wall 18 and to the lift-roof structure 15 with weatherproof joint means 42, 43 as employed typically in construction of a convertible automobile roof; said weatherproof joint means 42, 43 extending from a lower edge 44 of the cover left wall 24 to a lower edge 45 of the cover right wall 26. Suitable latching means 46, 47 are mounted at locations toward the rear wall 28 of the lift-roof structure 15 providing secure attachment of said lift-roof structure 15 to the load bed 12, when in a closed condition. A manual lift handle 49 is attached to the lift-roof structure 15 in a central, accessible location providing an even side-to-side distribution of applied vertical force for opening or closing.

Referring to FIGS. 1, 2, 3, and 4; left and right intermediate members 50, 52 are attached to the cover forward wall 18 by suitable fastening means 53, 54 and provide alternate upper (shown in broken line) and lower attachment positions for left and right extension members 56, 58 respectively with use of suitable fastening means 59. When in the lower attachment positions, as necessary for installed service, said extension members 56, 58 are attached to the left and right upper inside edges 60, 61 of the vehicle load bed left and right walls 36, 38 via left and right adjusting brackets 62, 63 respectively and suitable fastening or clamping means 64, 65. Left and right compression strut means forward attachment members 67, 68 are rigidly attached to said left and right extension members 56, 58 and to a lateral member 69 by means of stiffening members 70, 72 and suitable fastening means 74, 76, 78, so that a compression strut means forward attachment frame 80 is created therefrom, locating left and right forward pivotal attachments 82, 84 for left and right compression strut means 86, 88; said forward pivotal attachments 82, 84 being located in a geometric relationship with the hinge axis A—A and with suitable left and right compression strut means rearward pivotal attachments 90, 92 at the lift-roof structure 15, such that a desired amount of lift assist effort is provided when the lift-roof structure 15 is raised to an open position. Left and right fore/aft adjusting feet 94, 95 respectively are attached to said forward attachment frame 80 by suitable fastening means 96 in such a manner as to bear against the load bed forward wall 34, said fore/aft feet 94, 95 being adjustable in conjunction with adjustment at the left and right upper adjusting brackets 62, 63 so that satisfactory location and/or orientation of the forward wall 18 may be achieved relative to the lift-roof structure 15 and the load bed 12.

By the application of appropriate locations of common attachment points and lengths for left and right intermediate members 50, 52 and for left and right extension members 56, 58, said extension members 56, 58 may be attached to the intermediate members 50, 52 for normal use as shown in solid outline, or may alternately be attached for shipping or storage, as shown in broken outline. In combination with use of alternately located compression strut means forward pivotal attachments 98, 100 on the lower attachment members 67, 68, the compression strut means 86, 88 function, as shown in broken line in FIG. 2, in such a manner as to hold the cover forward wall 18 in a desired orientation relative to the lift-roof structure 15, with all component parts remaining above a plane across the lower edges 44, 45 of the lift-roof structure 15, as may provide convenience for purposes of shipping, handling and storage.

The left and right hinges 16, 17 are located immediately outboard of and partly overlapping intermediate members 50, 52 toward the left and right walls 24, 26 respectively of the lift-roof cover 10. In a preferred embodiment of the invention the lower edge 101 of the cover forward wall 18 is sealed to the load bed forward wall 34 with sealing means 102 and a window 103 is incorporated into the cover forward wall 18 to provide rearward visibility, as in conventional fixed mount load bed cover designs of the prior art. Sealing means 104, 105 are also interposed between the lift-roof cover left and right walls 24, 26 and the load bed respective left and right walls 36, 38; said sealing means 104, 105 typically being adhesively attached to left and right horizontal skirts 106, 107, respectively, at the lower edges 44, 45 of the left and right walls 24, 26.

Figure 5:
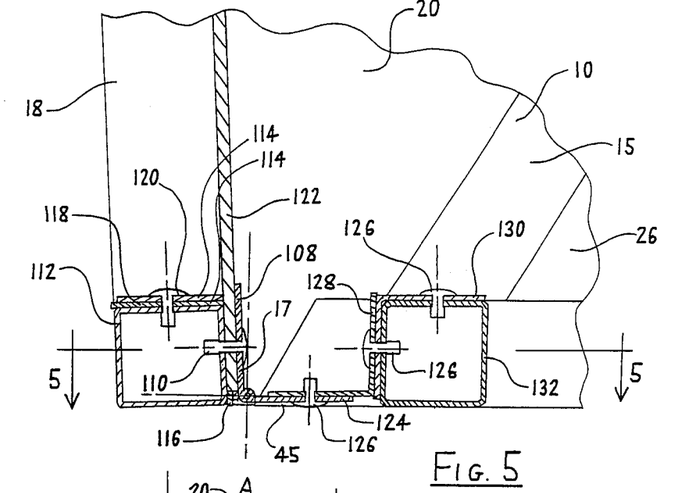
FIG. 5 is a fragmentary sectional side view along lines 4—4 of FIG. 6, showing a right hinge attachment of the lift roof structure to the cover forward wall.
Figure 6:
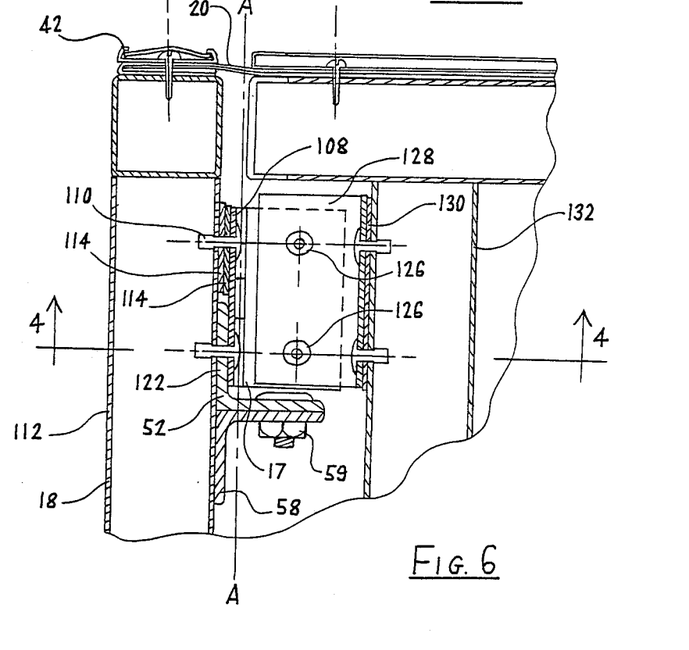
FIG. 6 is a fragmentary sectional plan view along lines 5—5 of FIG. 5.

Referring to FIGS. 5 and 6; a first leaf 108 of the right hinge 17 is attached by suitable fastening means 110 to a lower lateral member 112 of the cover forward wall 18. In order to provide mounting reinforcement for said hinge 17, one or more angle spacers 114, depending upon material thickness, may be employed having a first wall 116 interposed between the first leaf 108 and the lower lateral member 112. A second wall 118 of angle spacer 114 provides reinforced attachment via suitable fastening means 120 to the cover forward wall lower lateral member 112. Thickness of the angle spacers 114 is matched with thickness of a first wall 122 of the right intermediate member 52, so that the hinge 17 may overlap both said angle spacers 114 and said first wall 122 of the intermediate member 52. By this manner and means a location of the hinge axis A—A is provided which minimises or avoids stretching of the weatherproof fabric 20 in proximity to the lower edges 44, 45 of the load bed cover left and right walls 24, 26 when the lift-roof structure 15 is raised to an open position.

A second leaf 124 of the hinge 17 is rigidly attached by suitable fastening means 126 and support brackets 128, 130 to a lower forward member 132 of the lift-roof structure 15. By means of suitable relative positioning of the support bracket 128 and the second leaf 124 of the hinge 17, spacing is provided between the forward wall lower lateral member 112 and the lift-roof structure lower forward member 132, which spacing is sufficient to allow intermediate members 50, 52 and extension members 56, 58 to pass therebetween for any operating position of the lift-roof structure 15.

Referring to FIG. 1; a right pivot support 134 is fixedly attached to the lift-roof structure 15 in a rearward location. A right rigid strut 138 is attached by pivot means 140 to the pivot support 134 so that said right rigid strut 138 may be oriented approximately parallel to and above the lower edge 45 of the cover right wall 26, as shown in broken line, and retained in this position by engagement with a strut retaining means 142, or pivoted downward in the direction of arrow C. A suitable clamping means 144 is provided, which may be attached to the upper edge 61 of the load bed right wall 38 and may also be positively engaged with alternate fastening points 146 along the length of the right rigid strut 138. Fixed support of the lift-roof structure 15 may be provided for a range of orientations between fully closed and fully open by use of the right rigid strut 138 in combination with a left rigid strut 147; said left strut 147 being similar to and mounted in a fashion matching the method of mounting described for said right strut 138.

Figures 7, 8:
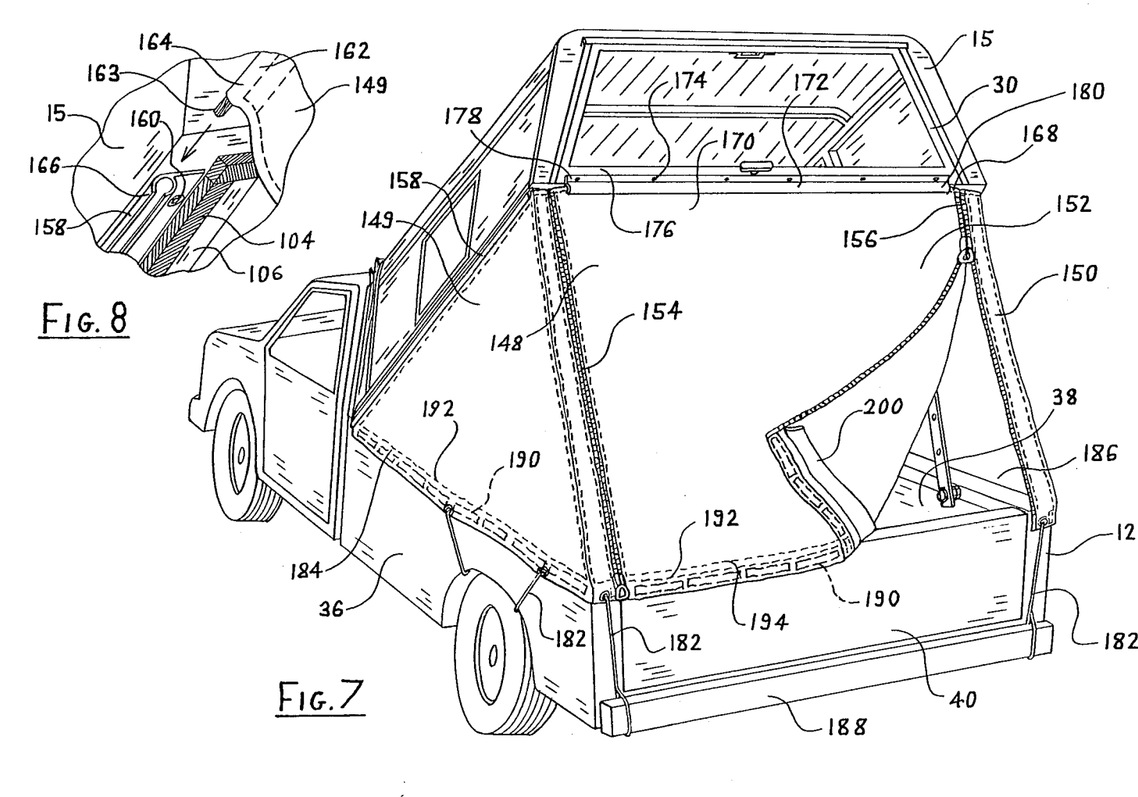
FIG. 7 is a perspective view from the rear of a lift-roof cover mounted on a light truck load bed in a raised condition with a flexible panel enclosure installed.
FIG. 8 is a fragmentary perspective view of a preferred method of attachment of a flexible panel to the lift-roof structure.

Referring to FIG. 7; an enclosure 148 is provided with the lift-roof structure 15 in a raised position by installation of a left flexible panel 149, a right flexible panel 150 and a rear flexible panel 152 between the lift-roof structure 15 and the vehicle load bed 12. Said flexible panels 149, 150, 152 typically are made from a tent fabric cut and sewn to an appropriate form. The rear panel 152 is attachable to the left panel 149 by means of a left zip joint 154 and to the right panel 150 by means of a right zip joint 156; said left and right zip joints 154, 156 being accessible for purposes of opening or closing from either inside or outside of the enclosure 148.

Referring to FIG. 8; the left flexible panel 149 is removably attached to the lift-roof structure 15 by means of a retaining rail 158, said rail 158 being attached by suitable fastening means 160 to the left horizontal skirt 106 immediately outboard of sealing means 104. The upper edge 162 of said left flexible panel 149 is stitched along its length around a rope insert 163, so that said upper edge 162 may be slid at its forward end 164 into engagement with the rearward end 166 of the retaining rail 158, being slid into said retaining rail 158 until fully captured along its length. The right flexible panel 150 is attached to the lift-roof structure 15 in a manner similar to that described for the left flexible panel 149.

Referring again to FIG. 7; the rear flexible panel 152 is, in like manner, removably attached to the rear hinged door or window 30 of the lift-roof structure 15 by engagement of a hemmed rope insert 168 at the upper edge 170 of said rear panel 152 with a retaining rail 172 attached with suitable fastening means 174 to a lower edge 176 of said rear door or window 30. The rear flexible panel 152 is installed by sliding the hemmed rope insert 168 at the upper edge 170 of said rear flexible panel 152 into full engagement with the retaining rail 172 from either the left end 178 or the right end 180.

Elastic or adjusting retaining means 182 are attached to the lower edges 184, 186 respectively of the left and right flexible panels 149, 150 and may be attached to the load bed 12 or a vehicle lower structural member 188 so that said flexible panels 149, 150 may be held in a taut condition. Magnetic retainer means 190 are captured by suitable sewn seams 192 along the lower edges 184, 186 of said left and right flexible panels 149, 150 and along the lower edge 194 of the rear flexible panel 152 and provide sealing of said lower edges 184, 186, 194 to the load bed walls 36, 38 and tailgate 40, where said walls 36, 38 and tailgate 40 are made of steel, while avoiding need for the addition of permanently attached flexible panel fastening means to the load bed 12.

Figure 9:
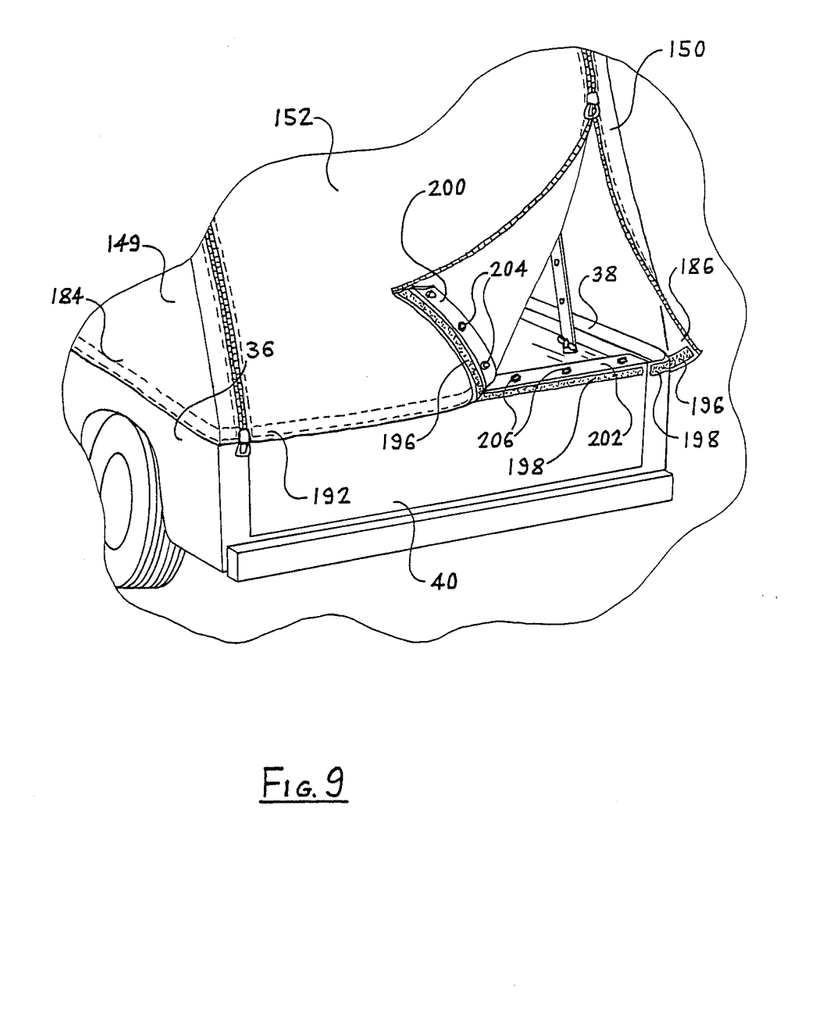
FIG. 9 is a fragmentary perspective view from the rear showing alternate methods of attachment of flexible panels to a vehicle load bed.

Referring to FIG. 8 and FIG. 9; Velcro fastening means first facings 196 shown in FIG. 9 may alternately be employed instead of the magnetic retainer means 190 shown in FIG. 8, said first facings 196 being sewn or bonded to the lower edges 184, 186, 192 of said left, right and rear flexible panels 149, 150, 152 respectively and engaging with Velcro fastening means second facings 198, said second facings 198 being adhesively attached to the load bed walls 36, 38 and/or tailgate 40. To illustrate a further alternate method of temporary fastening, a flap 200 for inside fastening of the rear flexible panel 152 is shown attachable to an upper surface 202 of the load bed tailgate 40 by means of female press fastener members 204 attached to said flap 200, said female press fastener members 206 being engageable with mating male press fastener members 206 mounted to the tailgate upper surface 202.

There has been described and illustrated what is considered a preferred embodiment of the invention. However, these specifications shall not be construed as limitations upon the scope of the invention, since it will be understood that many variations may be made by one who is skilled in the art without departing from the scope of the invention as defined by the appended claims. For example, the use of flexible fabric curtains to create full enclosure with the lift-roof cover in an open position for such purposes as camping may be accomplished with various configurations of curtains. Another example is that the height of the lift-roof structure may be made different to that of the passenger cab, so that the interposed flexible fabric forms a sloped blend from the passenger cab roof toward the lift-roof structure roof. Further examples include possible variations in attachment, or adjustment, of the cover forward wall relative to the load bed and configuration of the lift-roof to forward wall pivotal attachments or compression strut means pivotal attachments, which may also provide the claimed structure. Added refinements, which may further increase the usefulness of the invention, include the mounting of rigid shielding to the cover forward wall below the interposed flexible fabric to provide improved security, or around the compression strut means forward attachment frame to provide improved protection from possible contact damage.

I claim:

1. For a load bed comprising a floor, a load bed forward wall, a load bed left wall, a load bed right wall and a load bed rear wall with tailgate and tailgate opening: a cover providing load bed enclosure and including a cover forward wall attachable to said load bed in such a manner as to extend upward from the load bed forward wall; said cover also incorporating a lift-roof structure having a roof, a cover left wall, a cover right wall and a cover rear wall; said cover rear wall including a hingedly attached closure; said lift-roof structure being pivotally attached to the cover forward wall about a lateral axis in proximity to a lower edge of the cover forward wall; flexible weatherproof fabric being interposed between said cover forward wall and said lift-roof structure, so that an enclosure is formed above said lateral axis, allowing the lift-roof structure to be raised at the rear about said lateral axis from a lower, closed position to a raised, open position.

2. A cover as described in claim 1 in which position holding means are employed to provide fixed orientation of the lift-roof structure in one or more positions above a fully lowered position.

3. A cover as described in claim 1 in which position holding means are employed to provide fixed orientation of the lift-roof structure in one or more positions above a fully lowered position and in which flexible panels may be attached to the cover left and right walls, rear wall and hingedly attached rear closure to form a weatherproof enclosure of the load bed with the lift-roof structure in a raised position.

4. A cover as described in claim 1 in which left and right compression strut means are pivotally attached between the lift-roof structure and forward pivotal attachments, so that lift assist is provided in raising the lift-roof structure from a lower to a raised position.

5. A cover as described in claim 1 in which left and right compression strut means are pivotally attached between the lift-roof structure and forward pivotal attachments, said forward pivotal attachments being fixed relative to the cover forward wall, so that lift assist is provided in raising the lift-roof structure from a lower to a raised position and in which alternate location is provided for the compression strut means forward pivotal attachments relative to the cover forward wall such that said cover forward wall may be held in a desired orientation relative to the lift-roof structure with no part of said forward pivotal attachments or compression strut means extending below a plane across the lower edges of the lift-roof structure.

* * * * *